United States Patent

[11] 3,588,255

[72] Inventor John Alexander
 Wilmington, Del.
[21] Appl. No. 712,514
[22] Filed Mar. 12, 1968
[45] Patented June 28, 1971
[73] Assignee Technidyne, Inc.
 Wilmington, Del.
 Continuation-in-part of application Ser. No. 632,279, Apr. 20, 1967.

[54] OPTICAL ALIGNMENT METHODS AND MEANS UTILIZING COORDINATED LASER BEAMS AND LASER BEAM COORDINATING MEANS FOR SAME
26 Claims, 36 Drawing Figs.

[52] U.S. Cl. .................................................. 356/153,
 33/46.2, 356/172
[51] Int. Cl. ..................................................... G01b 11/27
[50] Field of Search ............................................. 33/46.2, 46,
 74; 356/138, 153

[56] References Cited
UNITED STATES PATENTS
3,279,070 10/1966 Blount et al. ................. 33/46
3,314,068 4/1967 Verive ......................... 331/94.5
3,321,248 5/1967 Williamson et al. ........... 356/153
3,469,919 9/1969 Zellner ........................ 356/4
3,471,234 10/1969 Studebaker ................... 356/138

OTHER REFERENCES
B. Feinberg, " Laser Tooling Goes to Work, " The Tool and Manufacturing Engineer, Oct. 1967 pp. 52— 6.
K. Skutley, " Precision Alignment Systems, " Civil Engineering-ASCE, Sept. 67, Vol. 37, pp. 44— 5

Primary Examiner—Ronald L. Wibert
Assistant Examiner—J. Rothenberg
Attorney—Birch and Birch ABSTRACT: Systems and methods for establishing and maintaining a laser beam as a straight line reference in space are provided in which a laser device emitting two laser beams in opposed straight line relationship is utilized in combination with reflective targets for each of the laser beams. The laser device and one of the targets are fixed at predetermined points in space and one of the beams is aligned on the one target. This constrains the other beam to a given position in space and the other target is placed in fixed alignment therewith at a random point in space to provide a reference point permitting the removal of the first target and/or destruction of its associated physical location without affecting the ability of the system to maintain substantially exact initial alignment of the beam. Other systems are provided for specifically determining subterranean location of pipeline inverts and/or centerlines referenced to the straight line reference and for establishing a subterranean laser beam reference in predetermined relationship to the straight line reference. Target structures and/or transducers for detecting, reflecting and/or indicating the impingement thereon of a laser beam and/or effecting the location of remote points in space of predetermined parametric relationship to said straight line reference are also provided. The laser beam targets utilize corner prisms for reflecting impinged beams back along their own axis for detection of a targeted condition at the laser device, screen and projection systems for visual indication of a targeted beam condition at points adjacent the laser beam and transducer means for alarm-type readout of a targeted condition, such readouts being provided either in qualitative or quantitative display modes.

PATENTED JUN28 1971

Inventor
JOHN ALEXANDER

By Birch & Birch
Attorney

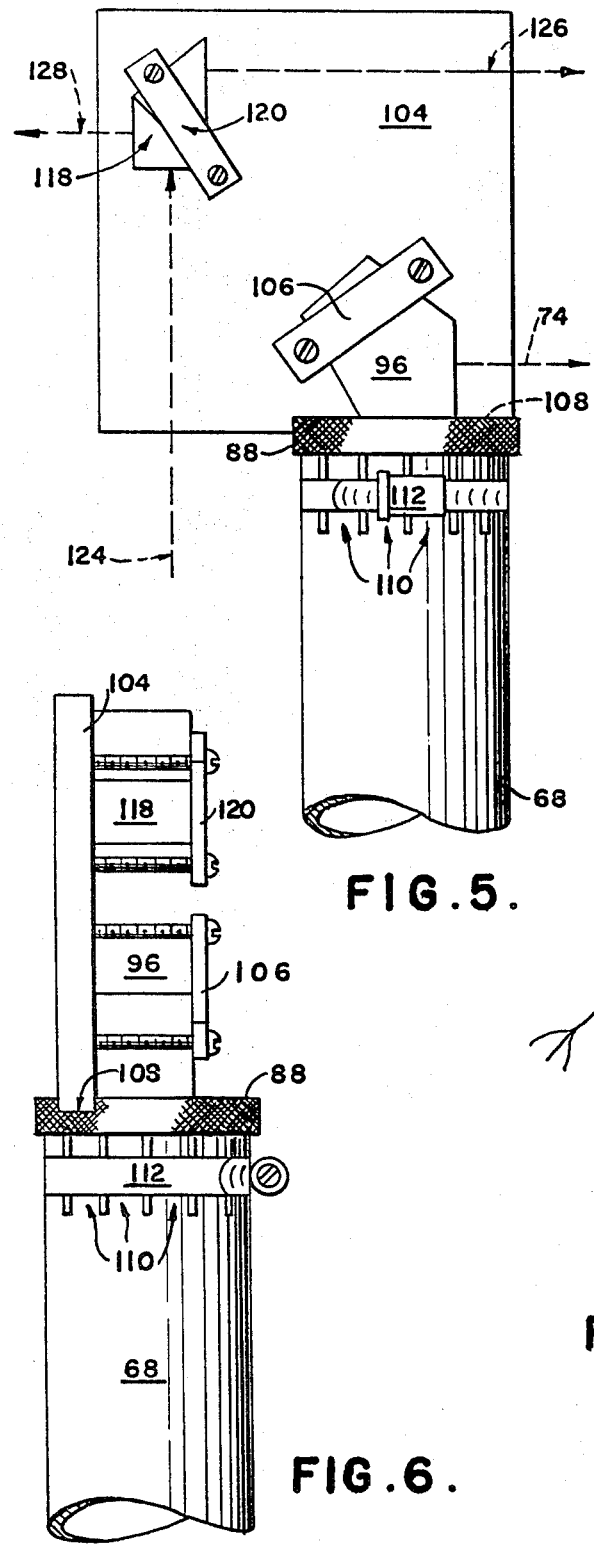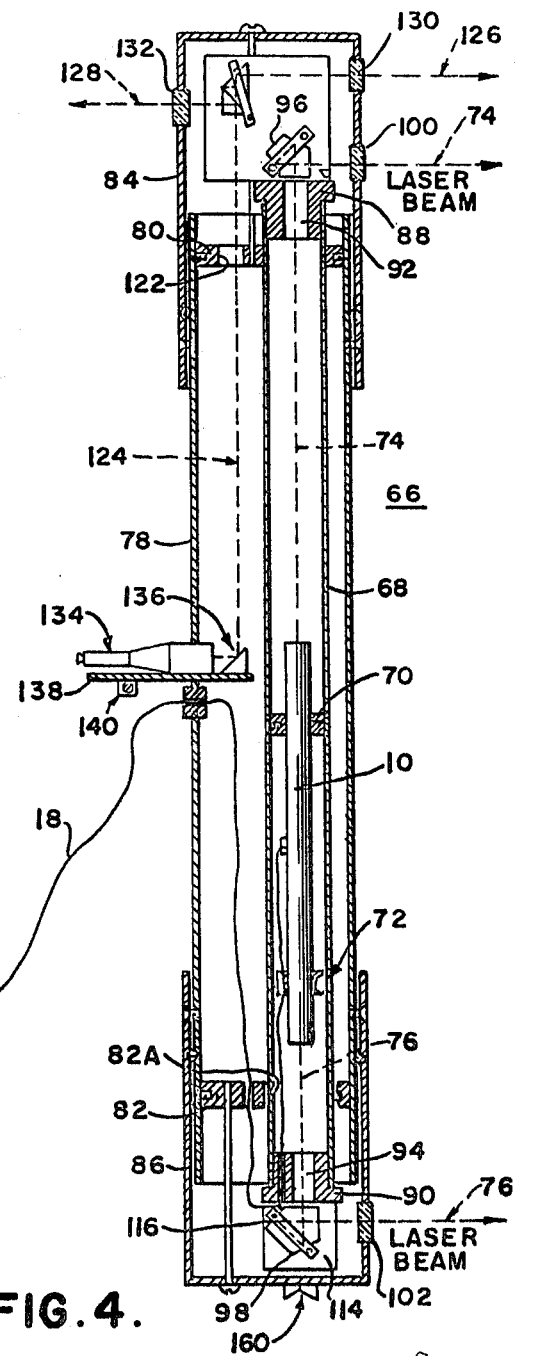

PATENTED JUN28 1971

Inventor

JOHN ALEXANDER

By

Birch & Birch
Attorney

INVENTOR
JACK ALEXANDER

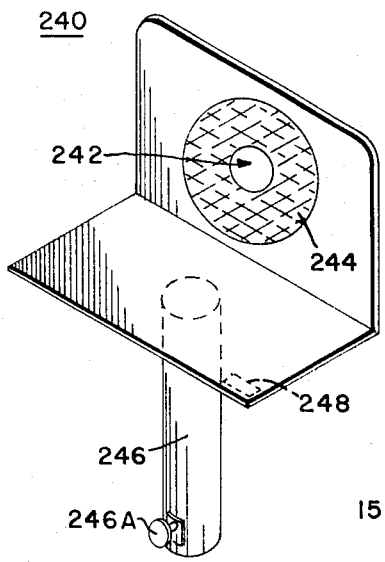
FIG. 14
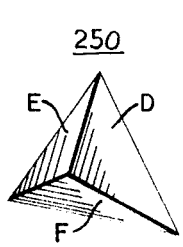
FIG. 15A
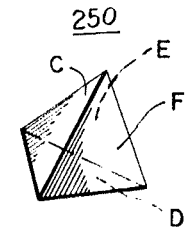
FIG. 15B
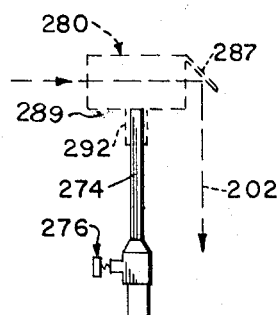
FIG. 15C
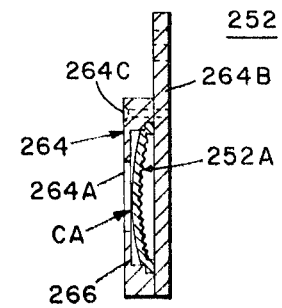
FIG. 15D
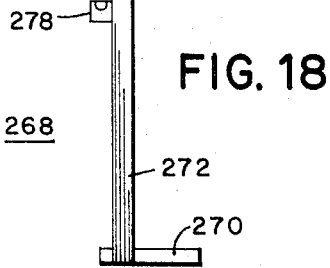
FIG. 18
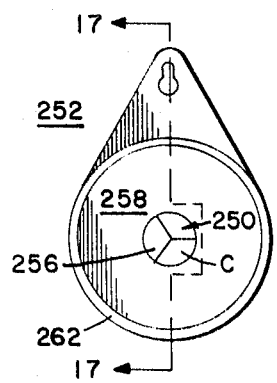
FIG. 16
FIG. 17
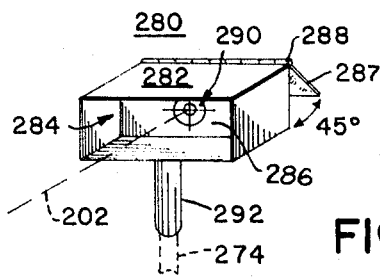
FIG. 19
INVENTOR
JACK ALEXANDER
BY Birch & Birch
ATTORNEY

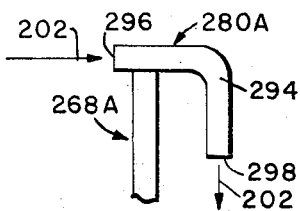
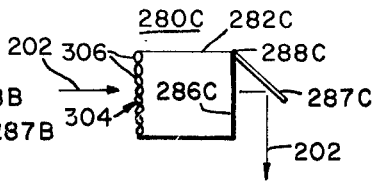
FIG. 20  FIG. 21  FIG. 22
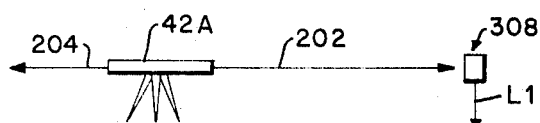
FIG. 23
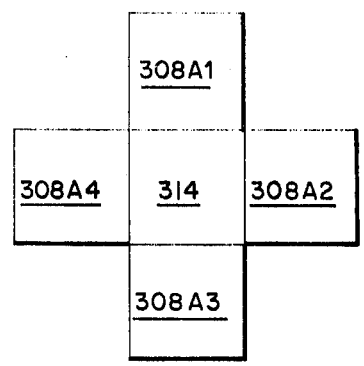
FIG. 25
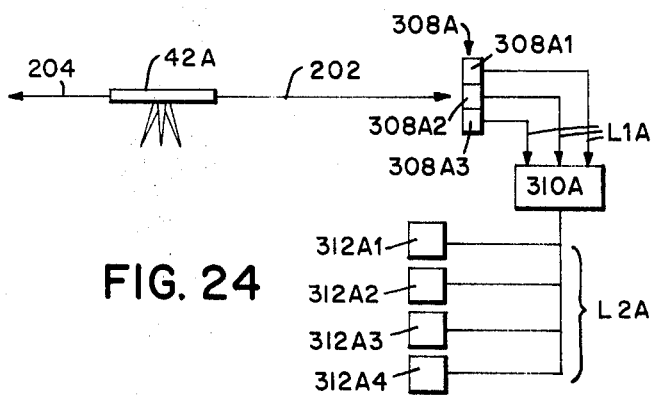
FIG. 24
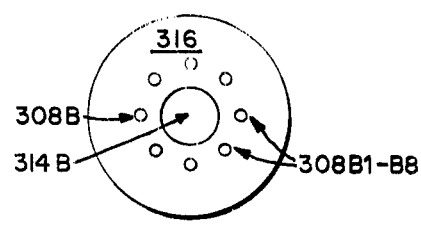
FIG. 27
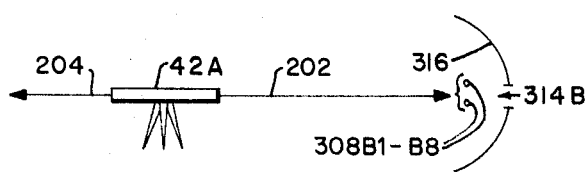
FIG. 26

INVENTOR
JACK ALEXANDER

OPTICAL ALIGNMENT METHODS AND MEANS UTILIZING COORDINATED LASER BEAMS AND LASER BEAM COORDINATING MEANS FOR SAME

This application is a continuation-in-part of my copending application, Ser. No. 632,279, filed Apr. 20, 1967, for "Optical Alignment Methods and Means Utilizing Coordinated Laser Beams and Laser Beam Coordinating Means for Same."

This invention relates to optical alignment and surveying methods, systems and means for providing an optical straight edge and reference in three-dimensional environments such as grading, pipe laying and the like.

More particularly, this invention relates to new and novel laser beam coordinating means whereby precise orientation of two or more laser beams, which may or may not include a reference beam, can be readily and selectively effected.

It is an object of this invention to provide a laser device having optical adjusting means incorporated therein to effect the emission of two laser beams in opposite directions therefrom and wherein said beams are controllable to effect precise 180° alignment thereof, and new and novel systems incorporating same.

Another object of this invention is to provide a system including a laser device emitting two laser beams in 180° alignment to provide an optical straight edge in three-space applications, and new and novel systems incorporating same.

Another object of this invention is to provide new and novel systems, methods and system components, including laser beam emitting means, for effecting highly accurate, predetermined, geometric orientations such as alignment of sectional pipes or structural components, highly accurate grading and highly accurate property or building line layouts, in three-dimensional environments.

Still another object of this invention is to provide a new and novel optical alignment system comprising a laser device emitting two laser beams in a preselected angular alignment, reference target means for each of said beams, said reference target means including reflective means, and optical viewing means permitting selective optical registry of said laser beams with said reference target means, and new and novel systems incorporating same.

Still another object of this invention is to provide a laser device providing two constantly displaced parallel laser beams.

Still another object of this invention is to provide a laser device providing two constantly displaced parallel laser beams comprising laser means emitting first and second laser beams in 180° alignment, and optical transmitting means including first and second pentaprism means, respectively, directing said laser beams into three-space in parallel relationship, and new and novel systems incorporating same.

Yet another object of this invention is to provide an optical alignment system comprising a laser device providing first and second parallel laser beams, first and second reference target means, respectively, for said laser beams, said reference target means including reflective means, and optical viewing means permitting selective optical registry of said laser beams with said reference target means.

Yet another object of this invention is to provide new and novel laser beam coordinating means whereby precise orientation of two or more laser beams, which may or may not include a reference beam, can be readily and selectively effected, and new and novel systems incorporating same.

These and other objects of this invention will become more readily and fully apparent with reference to the following specification and drawings which define several preferred embodiments of this invention.

In the drawings:

FIG. 4 is a side elevation in partial cross section of the laser device of FIG. 1 incorporated in a parallel beam projecting and viewing device;

FIG. 5 is an enlarged detail drawing of a prism mount in the embodiment of FIG. 4;

FIG. 6 is an end view of the detail of FIG. 5;

FIG. 14 is a perspective of an aperture target of the present invention;

FIGS. 15A and 15B are top plan and perspective views, respectively, of a corner prism beam target component of the present invention;

FIGS. 15C and 15D are front plan and cross-sectional views, respectively, of multiple corner prism beam reflectors of the present invention;

FIG. 16 is a front elevation of a fixed corner-prism target structure of the present invention;

FIG. 17 is a cross section taken along line 17–17 of FIG. 16;

FIG. 18 is a side elevation of a storey pole of the present invention;

FIG. 19 is a perspective of a storey pole mounted beam target structure of the present invention;

FIG. 20 is a schematic of a second embodiment of a storey pole mounted beam target;

FIG. 21 is a schematic of a third embodiment of a storey pole mounted beam target;

FIG. 22 is a schematic of a fourth embodiment of a storey pole mounted beam target;

FIG. 23 is a schematic of a combined story pole target and detector means;

FIG. 24 is a schematic of another embodiment of beam target means;

FIG. 25 is a front plan view of a detector array in the target means of FIG. 24;

FIG. 26 is a schematic of yet another embodiment of beam target means;

FIG. 27 is a front plan view of a reflector in the target means of FIG. 26;

DOUBLE BEAM LASER

Figure 1:
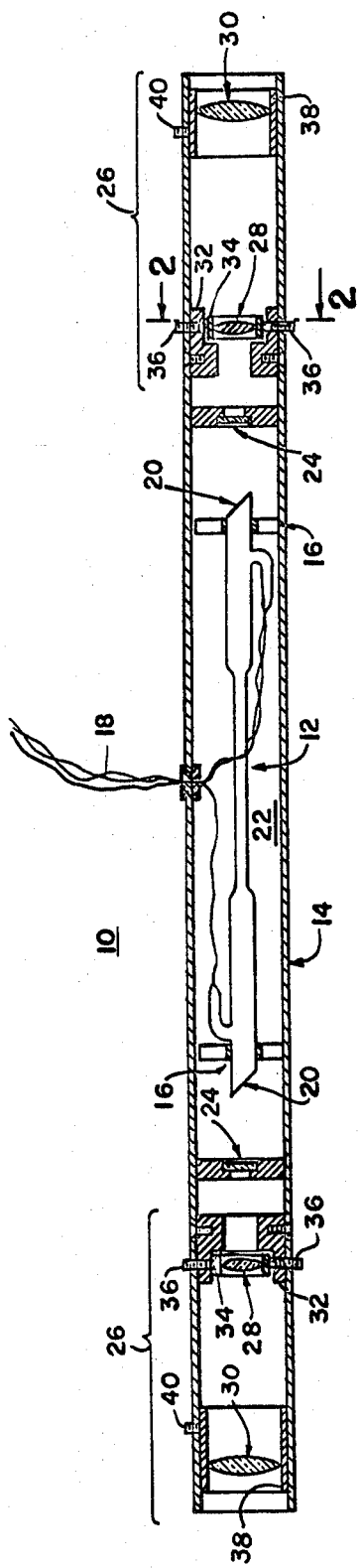
FIG. 1 is a side elevation in partial cross section of a two beam laser device of the present invention.

Referring in detail to the drawings and more particularly to FIG. 1, a preferred embodiment of a double-beam laser unit adapted for use in the present invention will now be described.

The laser unit 10 is generally comprised of an elongated gas discharge tube 12 coaxially mounted in an outer cylindrical protective housing 14 by means of an elastomeric shock absorbing mounting 16 at each end thereof and energized from a suitable source (not shown) through anode and cathode leads 18. The gas discharge tube 12 has an optical transmittance device known as a Brewster window 20 at each end thereof, thereby virtually eliminating reflection losses within the gas discharge tube 12.

The lasing cavity 22 which encloses the gas tube 12 is defined at each end thereof by a multilayer dielectric coated reflector 24 having a high reflectance, e.g. 98.8 percent, at the desired wavelength and a low transmittance, e.g. 1 percent, whereby both light reflection within the cavity 22 and light transmission out of the cavity 22 can be effected. The outer shell 14 comprises the remaining defining boundary for the lasing cavity 22.

The transmission of light out of the cavity 22 is substantially axial of the outer shell 14 and bidirectional, the light intensity in both directions being made substantially equal by preselection of the transmittance and reflectance qualities of the dielectric reflector 24.

Light transmitted axially through the Brewster windows 20 and dielectric reflectors 24 is then transmitted axially through telescope optics 26, located one in each end of the outer shell 14.

Figure 2:
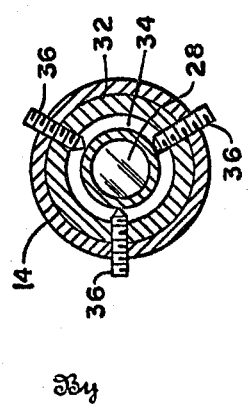
FIG. 2 is a cross section taken along line 2–2 of FIG. 1.

The telescope optics 26 each comprise an internal lens 28 and an external objective lens 30. These two lenses comprise a collimating, alignment and focusing means. The internal lens 28 is mounted in a fixed mounting ring 32 and an inner adjustable sleeve 34, the latter being displaceable transversely of the axis of the outer shell 14, in the mounting ring 32, by means of a plurality of set screws 36 or the like in the said mounting ring. This is shown in more detail in FIG. 2, where all the above-defined elements are shown in plan view.

The objective lenses 30, referring again to FIG. 1, are mounted in internally disposed, axially adjustable sleeves 38 in the outer shell 14, with set screws 40 being provided to fix the said sleeves 38 in the desired position.

In operation, when connected with a suitable power supply, the gas tube 12 is energized and the lasing cavity 22 emits coherent light through the dielectric reflectors 24, the emitted light being collimated, aligned and focused by the internal lenses 28 and objective lenses 30. By proper positioning of the internal lenses 28 the laser device 10 emits laser beams from each end thereof which are oriented in full 180° opposition, i.e., in complete opposed alignment through the laser device 10 and through space.

STRAIGHT LINE

LASER BEAM PROJECTOR ASSEMBLIES

Figure 3:
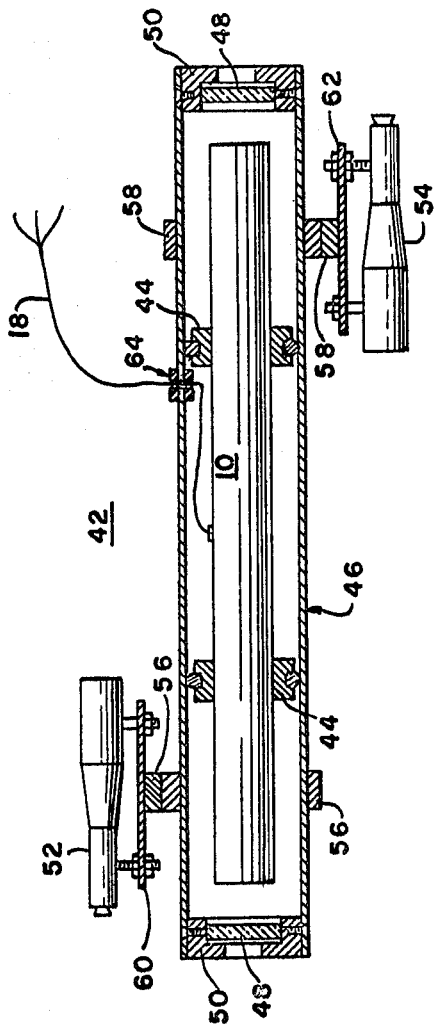
FIG. 3 is a side elevation in partial cross section of the laser device of FIG. 1 incorporated in a double beam projecting and viewing device.

Referring to FIG. 3, a first preferred embodiment of a laser beam projector assembly 42 is shown generally comprising a double-beam laser device 10 axially mounted in concentric elastomeric ring mounts 44 within a concentric projector housing or telescope tube 46. The telescope tube 46 is closed at each end with optical windows 48 in concentric mounts 50, the said windows 48 being in a plane inclined at a slight angle to the longitudinal axis of the laser device 10 to reduce reflections.

First and second telescopic sighting means 52 and 54 are mounted, respectively, adjacent opposite ends of the telescope tube 46 in substantially the same horizontal plane. First and second mounting rings 56 and 58 are provided for the first and second sighting means 52 and 54, respectively. The said rings are externally fixed to the telescope tube 46 and are provided, respectively, with scope brackets 60 and 62 adapted to detachably and securely mount the said sighting means 52 and 54 adjacent the telescope tube 46.

The power leads 18 for the laser device 10 pass through a rubber grommet 64 in the wall of the telescope tube 46.

The laser beam projector 42 is preferably used by clamping the midpoint of the telescope tube 46, in place of a conventional telescope tube, in an altitude/azimuth mechanism conventionally used with astronomical telescopes and the like. The altitude/azimuth device can then be mounted on either end of a conventional elevator post of a standard photographic tripod mount.

The power supply can be any suitable generator means conventionally known in the electronic art which, for example, is designed to supply 7.5 volts AC for the cathode and up to 6500 volts DC for the anode of the laser device 10 via the leads 18.

For field use of the laser projector assembly, gasoline motor-generator means or battery-inverter means can be utilized to provide complete portability.

Referring to FIGS. 4, 5 and 6, a second preferred embodiment of a laser beam projector 66 for providing parallel laser beam projections will now be described.

As in the previous embodiment of FIG. 3, the source of the laser beams is the laser device 10 which is axially mounted in a first, externally concentric, elongated tube 68 by means of elastomeric shock-absorbing O-rings 70 and 72.

In this embodiment, the laser device 10 projects its opposed beams indicated by phantom lines 74 and 76, along a vertical axis.

The first mounting tube 68 is mounted adjacent the longitudinal axis of and internally of elongated second mounting tube 78 which forms the outer protective cover means for the projector assembly 66. Upper and lower integral support rings 80 and 82, respectively, having bores therein offset from the axis of the second tube 78 are provided to fixedly retain the first mounting tube 68 within the second mounting tube 78. The upper support ring 80 holds the inner mounting tube 68 in rigid fixed engagement with the outer mounting tube 78. However, the lower support ring 82 engages the periphery of the inner mounting tube 68 through a sliding O-ring 82A, whereby distortions of or damage to the outer mounting tube 78 are precluded from affecting the precise optical alignment of the inner mounting tube 68.

The outer mounting tube 78 is provided with upper and lower housing collars 84 and 86, respectively, which include optical systems, to be hereinafter more fully described, for selectively directing the beams emitted from the laser device 10 in the inner mounting tube 68.

The inner tube 68 receives, at top and bottom, upper and lower prism plugs or caps 88 and 90 having optical bores 92 and 94 therein, respectively, in substantial axial alignment with the emitted beams 74 and 76 of the laser device 10.

Mounted in line with the bores 92 and 94 are first and second pentaprisms 96 and 98, respectively, in optical alignment with first and second glass windows 100 and 102, respectively. The said first and second windows 100 and 102 are mounted in the outer walls of the upper and lower housing collars 84 and 86, respectively, and face in substantially the same direction.

Referring additionally to FIGS. 5 and 6, the prism cap 88, first pentaprism 96 and the various interrelationships thereof will now be described in detail. It is to be expressly understood that the lower prism cap 90 and second pentaprism 98 are in the identical interrelationship at the lower end of the inner mounting tube 68.

The first pentaprism 96 is mounted on a first prism plate 104 by means of a first holding clamp 106. The first prism plate 104 is held in a receiving slot 108 in the upper prism cap 88.

The upper end of the inner mounting tube 68 is furcated as shown at 110 and receives a ring clamp 112 about the said furcated portion 110 for the purpose of securing the upper prism cap 88 therein against rotation and to permit selective rotational positioning of the first prism plate 104 and first pentaprism 96 for a purpose to be hereinafter more fully described.

As generally shown in FIG. 4, the inner mounting 68 adjustably mounts the lower prism cap 90, which mounts a second prism plate 114, which in turn mounts the second pentaprism 98 by means of a second holding clamp 116 in the same configuration as the upper prism cap 88, first prism plate 104, first pentaprism 96 and first holding clamp 106.

Referring again to FIGS. 4, 5 and 6, the first prism plate 104 mounts a prismatic beam splitter 118, by means of a third holding clamp 120, the said beam splitter being in optical alignment with an optical bore 122 in the upper mounting ring 80 and, hence, the interior of the outer mounting tube 78, as shown by the phantom lined light beam 124.

The beam splitter 118 causes forward and reverse light beams 126 and 128 (phantom lined) to be transmitted and/or received through forward and reverse viewing windows 130 and 132, respectively, in the upper housing collar 84.

As shown in FIG. 4, a viewing telescope 134 is provided perpendicular to the vertical axis of and approximately at the midpoint of the beam projector assembly 66, and is optically coupled with the light beam 124 within the outer mounting tube 78 by means of a 45° mirror 136 integrally mounted therewith on a telescope mounting plate 138. A bubble level 140 is provided on the telescope plate 138 to permit vertical attitude determination of the beam projector assembly 66.

Figure 8:
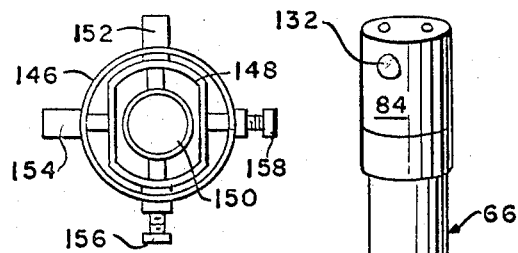
FIG. 8 is a top plan view of a gimbal detail of the mounting means of FIG. 7.
Figure 7:
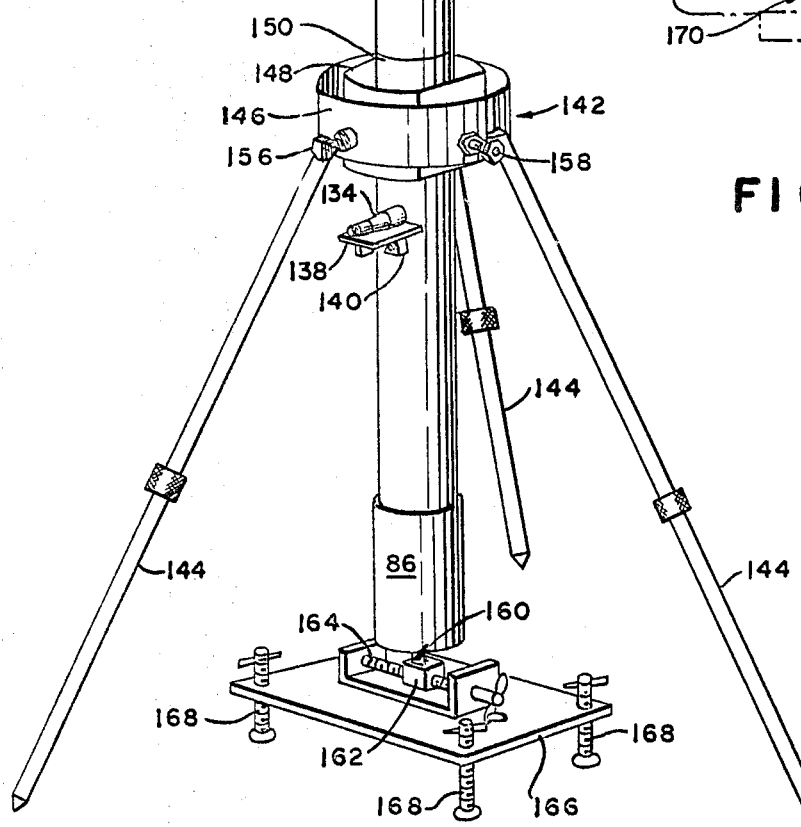
FIG. 7 is a side elevation of the embodiment of FIG. 4 in a mounting means for same.

Referring to FIGS. 7 and 8, the parallel laser beam projector assembly 66 is shown in a gimbal type tripod mount 142.

The mount 142 has telescoping legs 144 depending from a fixed outer ring 146, which encloses an intermediate gimbal ring 148 and an inner gimbal ring 150, the latter being in close circumferential contact with the outer mounting tube 78 of the projector assembly 66.

The gimbal rings 148 and 150 are adjustable about their respective pivots 152 and 154, by means of settable adjusting knobs 156 and 158, respectively, mounted in the fixed outer ring 146.

Referring to FIGS. 3, 7 and 8, there is a ball socket 160 provided on the bottom of the lower housing collar 86 which is adapted to be engaged by a traversing ball means 162 mounted on a traverse worm 164.

The traverse worm 164 is mounted on a bed plate 166 having a four point leveling assembly comprised of four height adjustable feet 168. The feet 168 and the legs 144 of the tripod 142 are adapted to engage the ground or other reference surfaces, whereby the lower end of the projector assembly 66 may be selectively displaced through the ball and traverse means 160-162-164 from any reference position of the base plate 166.

In the projector assembly 66 of FIGS. 4, 5 and 6, the use of the pentaprisms 96—98 provides optical means whereby an incident beam is always transmitted by internal reflection at an angle of ninety degrees (90°) from its original incident direction.

Therefore, the only possible error between the two parallel laser beams 74 and 76, when emitted from the transmission windows 100 and 102, respectively, is one of skew. This is based on the fact that initially, the laser device 10, as previously described in FIG. 1, projects in-line laser beams 180° out of phase.

Therefore, by adjusting the rotational position of the upper prism cap 88, the first prism plate 104 and first pentaprism 96 are adjustable in the skew dimension relative to the direction of transmittance of the lower prism 98 and the lower laser beam 76. The two laser beams 74 and 76, since they are always transmitted in parallel planes, may be readily corrected for skew error and thus transmitted in fully parallel relationship through space.

Figure 9:
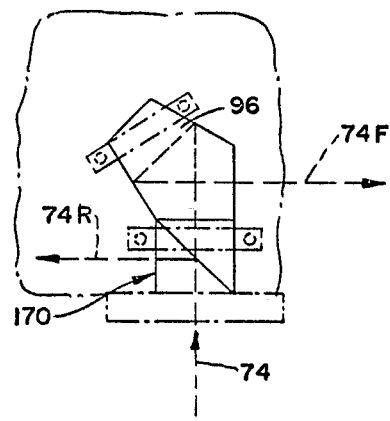
FIG. 9 is an enlarged partial detail of a pentaprism and combined beam splitter on a prism mount similar to that of FIGS. 4 and 5.

As schematically shown in FIG. 9, both forward and reverse transmission of a single laser beam at the first (upper) pentaprism 96 can be effected by incorporating a prismatic beam splitter 170 in the path of the incident laser beam 74. The beam 74 is divided into a reverse beam component 74R by the beam splitter 170 and into a forward beam component 74F, the latter being transmitted by the pentaprism 96.

The parallel beam projector assembly 66 is further stabilized by utilizing, in the inner mounting tube 68, material of high mechanical stability. Therefore, this stability in conjunction with the novel support ring mountings 80 and 82, precludes misalignment of the parallel planes of projection of the laser beams 74 and 76 because of vibrations, distortions of the outer mounting tube 78, motions of the laser device 10, motions of the pentaprisms 96 and 98 or motions of the inner mounting tube 68 per se. The only adjustment ever necessary, therefore, is in the skew dimension.

This may be readily effected by targeting the lower laser beam 76 on the lower end of a vertical standard or the like and then utilizing the viewing telescope 134 to target the upper laser beam 74 on the upper end of the same vertical standard, by adjusting the rotational position of the upper prism cap 88 as hereinbefore described.

A laser beam can be targeted by viewing the red glow emitted by the target device when the beam is impinged thereon. In the present invention, reflective means are included in the target devices to provide an optimum reflection of light energy back toward the source of the laser beam and the viewing telescope means associated therewith.

This, in all of the foregoing embodiments, the viewing telescopes 52, 54 and 136 can be utilized to detect proper targeting of a projected laser beam at substantial distance which would otherwise preclude such detection by the naked eye.

It becomes readily apparent, therefore, that the present invention provides optical straight edges comprised of precisely aligned multiple laser beams transmitted through space in a predetermined mutual relationship.

By the use of viewing telescopes and the targeting of one beam on any given fixed reference, other points in space may be readily and accurately located by the establishment of a targeted condition of the remaining beam or beams.

Therefore, such problems as surveying, grading, alignment of widely spaced objects, etc., may all be accomplished by the use of laser beams without the need for such cumbersome and inaccurate expedients as string lines, tapes and the like.

Furthermore, in all of the foregoing embodiments, the present invention provides lightweight, economical devices which provide multiple laser beams, and permit ready, selective and precise relative orientation of the multiple laser beams.

SYSTEMS

Measurements in three-dimensional environments, such as those required for surveying, grading and pipelaying, are provided by the targeting and beam reference systems of the present invention.

These systems will be described with specific reference to concepts of accurate alignment of subterranean pipes and the like. It is to be understood, however, that this particular end use of such systems is not limiting, but only exemplary of the inventive concepts in the following embodiments of such systems now to be described.

A. General Field System

Figure 10:
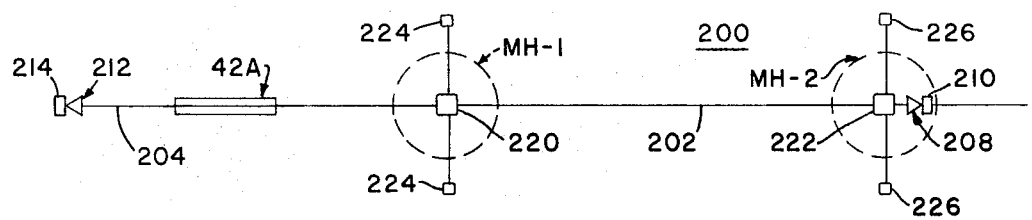
FIG. 10 is a schematic diagram in top plan view of a subsoil pipe alignment system of the present invention.
Figure 11:
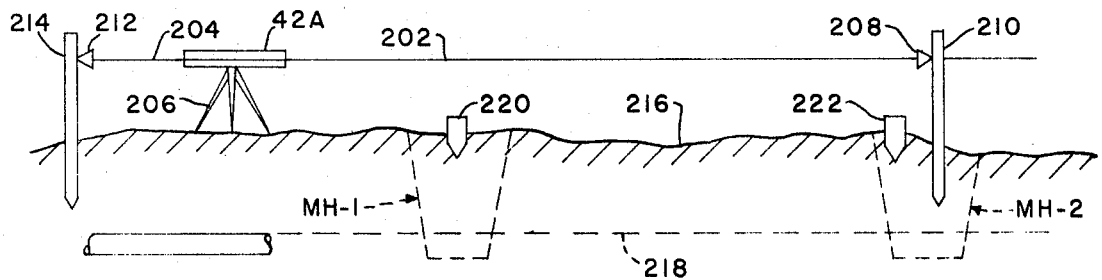
FIG. 11 is a side-elevational schematic of the system of FIG. 10.

Referring to FIGS. 10 and 11, a first embodiment 200 of a pipe-laying system of the present invention is shown as including a tripod-mounted double-beam laser device 42A, of the type described in FIG. 3, emitting a forward or working laser beam 202 and a back-beam or reference beam 204, the said beams being in 180° alignment. The tripod is shown at 206 in FIG. 11 and may be a conventional surveyor's transit or photographic tripod mount with adjustable altitude/azimuth mounting means (not shown) for the laser device 42A.

The system 200 further includes a forward or working target 208 on which the forward or working beam 202 is adapted to be impinged, the said working target 208 being mounted on a first target standard 210 or the like; and a reference target 212 on which the back or reference beam 204 is adapted to be impinged, the said reference target 212 being mounted on a second target standard 214 or the like. Both the first and second target standards 210 and 214 are adapted to be engaged with or fixed in the ground or other working surface 216.

The working and reference targets 208 and 212, respectively, are comprised of reflective devices which reflect the laser beams substantially directly back along their respective axes of propogation so that they may be viewed through the telescopic sighting devices on the laser device 42A. Such sighting devices have been shown in FIG. 3 at 52 and 54. An example of such a reflective device is a corner prism, to be hereinafter more fully described, which within a relatively wide range of incident angles will reflect a laser beam back along its axis of propogation.

Thus, a system comprising the basic components of a double-beam laser device 42A mounted for altitude/azimuth adjustment, first and second laser beams 202 and 204, first and second beam target means 208 and 212 and first and second target standards 210 and 214, provides a complete general field system for establishing a highly accurate reference line in three-space.

In operation, for example, assuming that it is desired to establish a reference line aboveground which is substantially exactly parallel to and directly above a subterranean pipe invert 218, running between first and second manhole locations MH-1 and MH-2, respectively, on relatively flat ground, the following procedure is utilized:

1. The first and second manhole locations MH-1 and MH-2 are established by first and second center hubs 220 and 222, respectively, and first and second pairs of offset stakes 224 and 226, respectively, by conventional surveying practice, with the elevation of the said center hubs 220 and 222 above the pipe invert 218 being predetermined.

2. The laser device 42A and tripod 206 are then set on the ground 216 in line with the manholes MH-1 and MH-2 at a convenient point outside the dimension therebetween such as, for example, ten (10) to fifty (50) feet behind the first manhole MH-1. The laser device 42A is then activated as previously described herein to effect propogation of the working and reference beams 202 and 204.

3. Place the first beam target 208 on the first target standard 210 immediately behind the second center hub 222 with the first target 208 at a predetermined elevation above the pipe invert 218.

4. Target the working beam 202 on the first beam target 208 by use of the telescopes (52 or 54) as previously described in the embodiment of FIG. 3, and maintain the said working beam 202 in this targeted condition.

5. Establish the working beam 202 at the same height above the pipe invert 218, at the first center hub 220, as the first target 208. This may be accomplished by an altitude adjustment of the laser device 42A on the tripod 206.

6. With the working beam 202 still targeted on the first beam target 208, mount the second target standard 214 directly in line with the reference beam 204 and hang the second beam target 212 on the said second target standard 214 at that vertical position at which the reference beam 204 is centered thereon (targeted). Again, this targeted condition is sensed by the telescopes (FIG. 3) on the laser device 42A.

Now, with the reference beam 204 targeted on the second beam target 212, the working beam 202 comprises a rigidly oriented "string-line" reference in three-space, from which the necessary alignment check and other dimensions needed to accurately position pipe section along the subterranean invert 218. The first beam target 208 and first target standard 210 may be moved to any position along the working beam 202 and the first beam target 208 recentered on the said working beam 202. Target elements and storey poles (to be hereinafter described) may also be used for intermediate measurements using the working beam 202 as a reference line.

Further, the passage of heavy equipment through the working beam 202 has not effect on its reference value as in the case of conventional string lines, surveying stakes and the like.

B. Parallel Laser Beam Systems no

It is often desirable to establish a pair of reference beams in three-space environments in parallel planes in which there is no skew between the two reference beams. In the pipelaying examples contained herein, one application of this type of system resides in an aboveground reference beam and a subterranean reference beam parallel with the first, the latter being aligned with the desired axis of the pipe sections to be in a subterranean trench or the like.

The parallel beam laser unit 66 of the embodiment of FIGS. 4 through 9 is directly adapted to such a system, requiring only the aboveground reference and working targets and storey poles of the embodiments of FIGS. 10 through 13. This becomes readily apparent from the description of the embodiment of FIG. 9, wherein the aboveground working beam is designated as 74F and the aboveground reference beam as 74R. The subterranean working beam is shown in FIG. 4 at 76 and, because of the unique parallel beam projection effected by this embodiment, no subterranean reference beam is needed.

In use, the tripod mount 142 of FIG. 7 is inserted in the pipe trench or manhole, such as the manhole MH-1 in the embodiment of FIGS. 10 and 11, with the lower laser beam at the same height as the centerline of the pipe to be layed, i.e., below the pipe invert 218. The reference beam 74R and the working beam 74F are then aligned with the reference target 212 and working target 208 as previously defined in the embodiments of FIGS. 10, 11 and 12.

With the alignment of the reference and working beams 74R and 74F, the mere positioning of the subterranean beam 76 at the height of the pipe center line, fully establishes the axis of a pipeline over the full useful range of propagation of the laser device 66.

Then, by using a centered target means, to be hereinafter more fully described, over the end of each pipe section to be layed, all that must be done is to visibly align the subterranean beam with the center of the target means and the pipe section will have been placed in a true coaxial position with the rest of the pipeline.

The use of two double beam laser devices 42A–A and 42A–S is possible to effect a similar parallel beam system, which will now be described with reference to FIG. 12.

As shown, the first laser device 42A–A is located above the ground 216 on a tripod 206 and the second laser device 42A–S is located below the ground 216, in the first manhole MH-1, and is suspended from a second tripod 206S. All of the remaining aboveground components in FIG. 12 bear identical numerals to like parts in the embodiments of FIGS. 10 and 11. Similar components which have been relocated below the ground 216 bear the suffix S.

The first manhole MH-1 is shown as excavated down the pipeline 228 for a distance of ten (10) to twenty (20) feet, for example, with a new center hub 220S in the bottom of the said first manhole MH-1. The second or subterranean laser device 42A–A is mounted in suspended fashion from a second tripod 206S at the new center hub 220S.

After the aboveground working beam 202 and aboveground reference beam 204 are targeted, the subterranean laser device 42A–S is suspended so that the height of the subterranean working beam 202S is coincident with the height of the pipe centerline 230.

Then, a rough alignment of the subterranean working beam 202S is effected to coincide with the expected centerline 230 of the pipeline 228 to be laid. This facilitates the accurate determination of the pipe centerline 230 by means of a reflex target and storey pole (not shown) to be hereinafter described with reference to FIGS. 18 and 19 at a point of ten (10) to twenty (20) feet from the working hub 220S. At this point a marker stake or auxiliary hub 220S' is driven into the bottom of the trench directly below the working beam 202 and a mark CL is placed thereon at the exact height of the pipe centerline 230.

The subterranean working beam 202S is then sighted to impinge directly on the centerline mark CL and the laser device 42AS locked in position on the tripod 206S to maintain this orientation of the subterranean working beam 202S.

Figure 13:
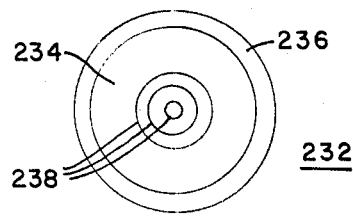
FIG. 13 is a front plan view of a pipe-mounted target device for use in the system of FIG. 12.

Now, each pipe section 228S, to be annexed to the pipeline 228, is capped with a suitable target device 232, shown in plan view in FIG. 13, which may include, for example, a translucent plate 234 mounted in a pipe conforming frame 236, the said translucent plate having bullseye rings 238 thereon for the purpose of visually placing the latter in registry with the subterranean working beam 202S. The bullseye rings 238 are so placed in the translucent plate 234 as to be at, and concentric with, the centerline of the pipe section 228S on which the frame 236 is engaged.

After laying pipe section 228S for thirty (30) to fifty (50) feet, a story pole and reflex target check from the working beam 202 should be made at these intervals to assure that the original short sighting of the subterranean working beam 202S on the intermediate hub or marker 220S' is sufficiently accurate for longer distances. Such periodic checks provide correction for alignment errors which more readily arise under conditions where a short sighting radius is used to initially align a laser beam such as the subterranean working beam 202S.

Therefore, combined with such periodic alignment checks, adjustment of the position of the pipe section 228S to register the central bullseye with the subterranean working beam 202S results in a substantially exact coaxial alignment of the pipe section 228S on the pipe centerline 230 of the pipeline 228.

Figure 12:
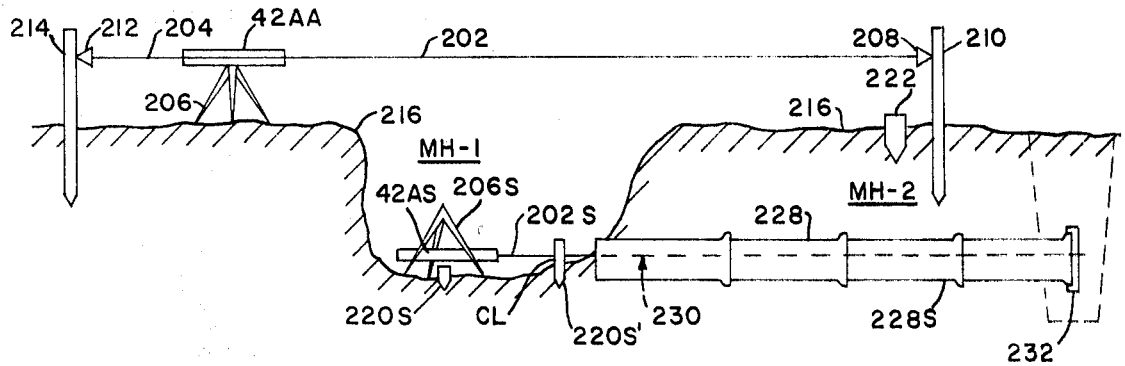
FIG. 12 is a schematic diagram of another system of the present invention incorporating parallel laser beams.

Further, as previously described, the system of FIG. 12 can incorporate a single parallel laser beam device 66 in the first manhole MH-1 in place of the two laser devices 42A-A and 42A-S shown.

THE BEAM TARGETS

A. Intermediate Target Means

To Facilitate Targeting Of

Beams In The System

There are many instances where point-to-point distances are relatively long, and/or the targeting of a laser beam on the ultimate, relatively distant, beam target may be somewhat tedious.

To facilitate the targeting of the working beam 202 on a distant beam target, an intermediate beam target mounted on a storey pole is selectively placed at a point intermediate the laser device 42A and the distant beam target.

The intermediate beam target 240, referring now to FIG. 14, is a circular reflective device having a central optical aperture 242 therein, the aperture 242 being adapted to be positioned in line with the working beam 202 when the said beam 202 is targeted on a distant beam target such as the first beam target 208 in FIGS. 10 and 11. The aperture 242 of the intermediate beam target 240 acts as an aperture sight through which to aim a working laser beam, thereby confining the area in which final targeting of the working beam on the first beam target 208 (or other remote beam target) must be effected.

The optical aperture 242 in the intermediate target 240 is surrounded by a highly reflective matrix 244 of corner prisms, such a matrix and its effects to be hereinafter more fully described with reference to FIGS. 15A, 15B, 15C and 15D. If the working beam is not properly oriented through the aperture 242, the prism matrix 244 will reflect a bright red glow to an aboveground operator indicating resighting of the laser device (42A) is necessary.

The intermediate target 240 is mounted as an integral part of a tubular, dependent, storey pole socket 246 having a set screw 246A at the lower end thereof for a purpose to be hereinafter more fully described in reference to FIGS. 18 and 19, wherein a similar socket and additional target embodiment are shown.

A dependent tape hook 248 in the form of a loop is mounted integrally with the lowermost surface of the intermediate target 240 and its use and purpose will also be fully described hereinafter.

B. Reflective Reference and Working Targets

The beam targets 208, 212 and 240 previously described in the foregoing systems are preferably of the prismatic type As shown in FIGS. 15A and 15B, a corner prism 250 is a transparent, trihedral, equilateral pyramid having a base face C and side faces D, E and F.

Corner prisms such as the corner prism 250 have the optical characteristic that a beam incident on the base face C is always reflected back along itself regardless of the angle of incident of the beam.

Therefore, a laser beam incident on the base face C will be reflected back along itself directly toward its point of origin, and such a reflected beam can be detected by devices such as the telescopes 52, 54 in FIG. 3 or the telescope 134 in FIG. 4.

One embodiment of such a corner prism target 252 is shown in FIGS. 16 and 17.

A corner prism 250 is shown mounted by leaf springs 254 or the like with its base face C covering an optical aperture 256 in the obverse wall 258 or a prism housing 260.

The prism target 252 is completed by a hood or light shield 262, which is cylindrical in cross section and is disposed about the periphery of the obverse wall 258, the latter being circular in plan view.

The rear wall of the prism housing 260 extends vertically to provide a hang tab or bracket 264 for the purpose of securing the target 252 to a storey pole or the like such as the poles 210, 214, and 230 in the embodiments of FIGS. 10 through 14.

If desired, the single corner prism 250 in the prismatic beam target 252 may be replaced with an array of corner prisms integrated in the form of a circular plate or the like.

Such an arrangement is shown at 252A in FIGS. 15C and 15D as a plate 264 comprised of a plurality of corner prisms 250A, having their base faces CA in a common plane adjacent the obverse surface 266 of the plate 264. This arrangement has the advantage of providing a greater targeting area, facilitating the targeting of a laser beam on a fixed prismatic target embodying the prismatic array 252A, This type of array with a central aperture formed therein corresponds to the prismatic array 244 in the intermediate target structure 240 of FIG. 14.

The plate 264 is shown as a hollow retaining ring in cross section having an aperture 264A therein defining a target area on the corner prism matrix 252A, The plate 264 is held onto a backing plate 264B by means of holddown screws 264C or the like.

The backing plate 264B is provided with an extended cutout hanger portion 264D for the purpose of securing the corner prism target 252 to a target standard or the like such as the standards 210 and 214 previously described herein with reference to FIGS. 10 and 11.

C. Storey Poles and Viewing Targets

Provision must be made in field use of the systems of FIGS. 10 through 14, for workmen to utilize the established aboveground working beams 202, along their entire useful lengths, to determine the proper vertical displacement of such as pipe inverts or pipe centerlines therefrom.

For this purpose, referring now to FIGS. 18 and 19, a vertically adjustable storey pole assembly 268 is shown as including a foot portion 270, a main shaft portion 272 extending upward from the foot portion, a telescoping upper shaft section 274 mounted within the main shaft portion 272, a set screw or clamp 276 for holding the upper shaft portion 274 in a desired extended position, a bubble level 278 or the like adjacent the clamp 276 on the main shaft portion 272, and a beam target means 280, shown in phantom lines in FIG. 18, mounted on the upper end of the upper shaft portion 274.

The beam target means 280 comprises a shadow box 282 having an open obverse face to provide a peripheral light shield 284, and a rear face comprising a viewing mirror 287, open to observation from below the shadow box 282 and extending from the upper edge 288 thereof at a forty-five degree (45°) angle. A dependent tape hook 289 is shown in phantom lines in FIG. 18 on the lowermost surface of the shadow box 282 for a purpose to be hereinafter more fully described.

The translucent target screen 286 is provided with a centered crossmark and bullseye ring marking 290, directly in line with a dependent storey pole receiving socket 292. The socket 292 comprises a dependent tube section for telescopically receiving the upper end of the upper shaft portion 274 of the storey pole assembly 268.

A laser beam, shown as the forward working beam 202 of the previously described systems of FIGS. 10 through 14, is shown impinging on the translucent target plate 286 at the center of the crossmark and bullseye ring marking 290.

Upon observing the viewing mirror 287 from below, the beam target marking 290 is visible to the eye of an observer and the illumination of the laser beam 202 can also be seen as a spot of bright red light.

By use of the bubble level 278 to maintain the storey pole in a vertical position and by moving the assembly 268 to effect impingement of the laser beam 202 on the center of the target marking 290 by visual observation of the mirror 287, and vertical dimension from the laser beam to the foot 270 of the storey pole assembly 268 can be effected by manipulation of the set screw or height clamp 276.

Thus, the main shaft portion 272 and upper shaft portion 274 may be constrained to a desired longitudinal dimension, and the working laser beam 202 targeted on the target marking 290, whereby the foot 270 of the storey pole assembly 268 will be constrained to a position at a predetermined vertical distance from the working beam 202.

The foot 272 of the storey pole assembly 268 can be positioned, therefore, at a pipe invert or pipe centerline and a reference marker or the like may then be utilized to accurately mark this position.

Several alternate embodiments of the beam target means 280 of FIGS. 18 and 19 will now be described with reference to FIGS. 20, 21 and 22.

Referring first to FIG. 20, a storey pole assembly 268A is schematically shown and includes a beam target device 280A comprising a right-angle light pipe means 294. The light pipe means can be a Lucite plastic rod or a fibre optics bundle. In either case, the incident working beam 202 will be "piped" through the light pipe means 294, upon the achievement of a targeted condition on the obverse surface or face 296 of the light pipe means 294, to an observer beneath the rear face 298 thereof.

Thus, visual detection of a targeted condition of the working beam 202 can be effected.

Referring next to FIG. 21, a beam target device 280B is schematically shown as including a ground glass or lenticular target screen 286B having an internally reflective light gathering funnel 300 affixed to the obverse face thereof and a forty-five degree (45°) mirror 287B affixed to the upper edge 288B of the target screen 286B. As shown in phantom lines, a light gathering lens device 302 can be placed across the obverse portion of the reflective funnel 300 to enhance the light gathering power of the target device 280B.

Referring to FIG. 22, a beam target device 280C is shown as comprising a boxlike housing 282C with a transparent lenticular sheet 304 as the obverse face thereof and a ground glass or other translucent target screen 286C as the rear face thereof, the latter being displaced from the lenticular sheet 304 by a distance equal to the focal length of the individual lenses 306 therein. The assembly is completed by a 45° mirror 287C mounted on the upper edge 288C of the target screen 286C.

All of the foregoing embodiments of visual beam target devices 280—280C solve the problem of visually locating a beam from a low power helium-neon laser or the like under high ambient light conditions, such as out-of-doors in full sunlight, and then effecting accurate centering of the said laser beam on a reference target from which reference measurements can be made to locate other points having a predetermined dimensional relationship with the center of the laser beam.

D. Target Means With Automatic
and/or Remote Readout

There are many instances in which visual observance of a target device may be impractical, undesirable, hazardous or even impossible. In such situations, means must be provided to effect beam targeting even though an operator may not have access to or be sufficiently close to a target device to visually observe the impingement of a laser beam on the center of the target screen, i.e., a targeted condition of the beam.

For such purposes, the target means can be comprised of photodetector means or the like connected with suitable amplification and readout devices, the latter being remotely positioned with respect to the target means.

Several embodiments of such devices will now be described with reference to FIGS. 23 through 27.

Referring first to FIG. 23, a laser device 42A is shown emitting a reference beam 204 and working beam 202 as previously described with reference to FIGS. 10 through 14.

A target device 308, comprising a photoelectric detector cell is shown in the path of the working beam 202. When the working beam 202 is targeted on the photodetector target device 308 a response signal is generated in the latter and fed through an output network L1 to an amplifier 310. The amplifier 310 effects an amplified output signal in response to the response signal of the photodetector target device 308 which energizes an alarm device 312 through an output circuit L2.

Thus, upon the occurrence of a targeted condition, an audible and/or visual indication of such condition is effected in the alarm device 312.

The photodetector target device 308 may be mounted on any suitable ambulatory device (not shown) whereby it is adapted to be placed in the path of the working beam 202.

Referring next to FIGS. 24 and 25, a photodetector target device 308A is shown as comprising a matrix of four photodetectors 308A1, 308A2, 308A3 and 308A4 oriented to form the respective walls of a center hole or optical passage 314.

A plurality of output leads L1A extend from the individual photodetectors 308A1—308A4 to a multiple channel amplifier 310A, the latter having a respective multiplicity of output channels L2A connected to a plurality of alarm devices 312A1, 312A2, 312A3 and 312A4, corresponding respectively to the photodetectors 308A1, 308A2, 308A3 and 308A4.

In operation, if the working laser beam 202 is targeted, it passes through the central optical passage 314 and no alarm indication is provided. If, however, the beam 202 is not centered, it will impinge upon one of the photodetectors 308A1—A4 in the target array 308A and will effect an output signal from the amplifier 310A to the corresponding one of the alarm devices 312A1—A4.

Accordingly, by proper arrangement of response characteristics of the alarm devices 312A1—A4, the direction of misalignment of the working beam 202 with respect to the centered optical passage in the target array will be indicated. Lights, colors and tones are examples of the response characteristics which may be used.

The target array 308A may be used as a fixed target means upon which a laser beam can be remotely targeted or a movable target means, such as the target device 236 in the embodiments of FIGS. 12 and 13.

Referring now to FIGS. 26 and 27, a target device 308B is shown as comprising a ring or circular array of eight photodetectors 308B1—B8 surrounding a central optical passage 314B in a parabolic reflector 316.

The ring of photodetectors 308B1—B8 is positioned at the focus of the reflector 316. This embodiment is similar to the embodiments of FIGS. 24 and 25 but has the advantage of greater light gathering power and, thus, more sensitivity. Multiple channel amplifier and multiple alarm circuitry, as disclosed in the embodiments of FIGS. 24 and 25, is used to effect readout of relative orientation of the working beam 202 and central optical aperture 314B of the target device 308B.

It is to be understood that in all of the foregoing embodiments employing photodetector means, either differential detection devices, narrow-band optical filters, or other known compensating means can be utilized to cancel out the effect of ambient light on the response of the target means to prevent false triggering or other error.

E. Storey Pole and Target Structure Having Integral Level and Length Determining Means Thereon For Readily Determining Vertical Distances Below Working Beams Rapid and accurate leveling of storey poles and determination of vertical displacements from the foot of the storey pole to the aboveground working beam in the foregoing systems is highly desirable.

A structure for accomplishing such rapid and accurate orientation and measurement will now be described with reference to FIG. 28, in which like parts to FIGS. 18 and 19 will bear like numerals with the suffix E.

The storey pole assembly 268E may include a reflex or reflective target 280E similar to the target 280 of FIGS. 18 and 19 or an aperture target 240 as shown in FIG. 14.

Figure 28:
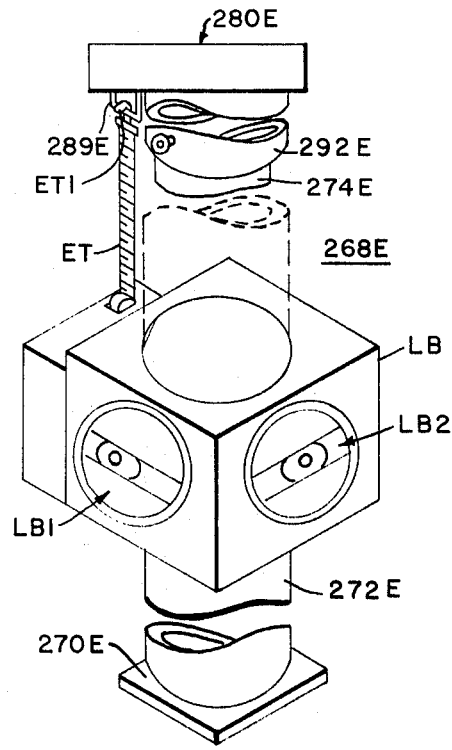
FIG. 28 is a perspective of a storey pole and target assembly having a combined level block and length determining structure thereon.

The dependent tape hook 289E of FIG. 28 is, therefore, interchangeable with the tape hook 248 of FIG. 14; and the storey pole socket 292E of FIG. 28 is interchangeable with the socket 246 of FIG. 14.

A fixed rectangular level block LB is mounted integrally with the main shaft portion 272E of the storey pole assembly 268E at a known distance from the foot portion 270E thereof. The level block LB includes first and second horizontal bubble levels LB1 and LB2, respectively, on adjacent vertical side faces thereof, whereby the said first and second bubble levels LB1 and LB2 are orthogonally related.

An engineer's tape ET of the retractable-type is mounted in a unit on another of the vertical side faces of the level block LB and includes a hook ET1 which, as shown, is adapted to engage with the dependent tape hook 289E on the beam target 280E to maintain the said tape ET in extended position parallel with the storey pole sections 272E and 274E.

The dependent tape hook 289E (or 248 of FIG. 14, as the case may be) is placed at a known distance below the center of the target 280E (or 240 of FIG. 14, as the case may be).

When initially assembled, the storey pole assembly 268E is extended so that it is at a known length from the center of the target 280E (or 240 of FIG. 14, as the case may be) to the foot 270E.

Then, the level block is set at a fixed position on the main shaft portion 272E such that the tape ET, with its hook ET1 engaged with the dependent hook 289E (248), reads the true length from target center to the foot 270E less a fixed amount, such as, for example sixty (60) inches.

Thereafter, in field use, the tape ET will provide direct readout of the distance from the target center to the foot 270E of the storey pole assembly 268E, by merely adding the fixed amount (60 inches) to the actual tape reading. Measurement is thus rapidly and accurately achieved.

Further, the orthogonally related first and second bubble levels LB1 and LB2 provide a rapid and accurate means for assuring an operator that the storey pole assembly 268E is in a truly vertical orientation ("hanging plumb") from an aboveground working laser beam of the present invention.

Figure 28A:
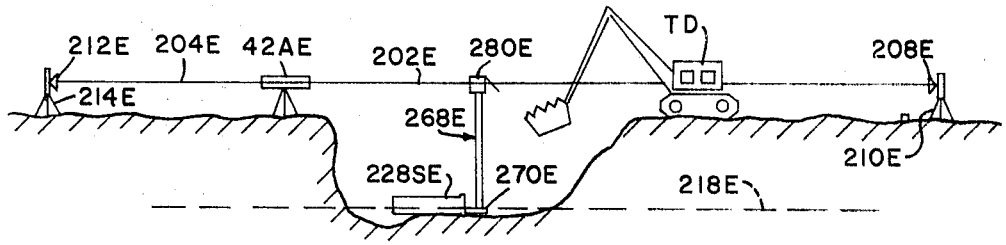
FIG. 28A is a schematic illustrating field use of storey pole assemblies of the present invention as well as other desirable features thereof.

Field use of the storey pole assembly 268E is exemplified by reference to FIG. 28A, wherein such a pole assembly 268E is shown locating a pipe section 228SE on a predetermined pipe invert 218E from a working beam 202E.

Further illustrated in FIG. 28A is a reference beam 204E, a reference target 212E, reference target standard 214E, laser device 42AE, working beam target 208E and working beam target standard 210E. There is a trench digger or back-hoe TD shown directly in the path of the working beam 202E which illustrates the desirability of the systems of the present invention regardless of obstructions between the laser device 42AE and the working beam target 208E once the reference beam 204E has been targeted.

In fact, by merely reestablishing the position of the reference beam target 212E and the laser device 42AE along the pipeline previously laid, the use of intermediate targets such as 280E and additional working beam targets 208E are readily seen as providing the means whereby accurate grades, inverts, pipe centerlines and the like can be readily effected regardless of obstacles such as equipment and raised or rolling ground between spaced manholes.

In some cases, such as in the case of rolling ground, the use of extra sets of surveying hubs, between manholes and on the side of a ground rise toward the laser device 42AE, is desirable to establish a target standard and working beam target position between the manhole positions described in the foregoing embodiments.

Thus, it can be readily seen that the systems and devices of the present invention provide reference lines in three-space limited only to the extend of the usable range of propogation of the laser device 42AE.

It should be noted that elements similar to all of the foregoing embodiments bear like numerals with the suffix E in FIG. 28A.

Means For Diverting The Reference Beam In The Event That The Area To The Rear Of The Laser Device Is Obstructed Or Inaccessible In the case where the opposed straight line relationship between the reference beam 204 and the working beam 202 of the laser device 42A cannot be utilized in the employment of the systems of FIGS. 10 through 14, means must be provided for accurately diverting the reference beam 204 to an out-of-line target device without any loss of accuracy in the system.

Figure 29A:
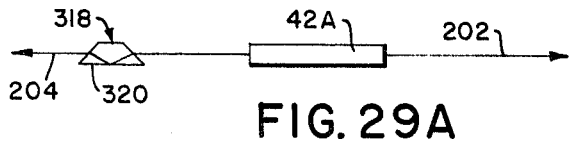
FIGS. 29A, 29B, 29C and 29D are schematic diagrams of means for selectively diverting a laser beam.
Figure 29D:
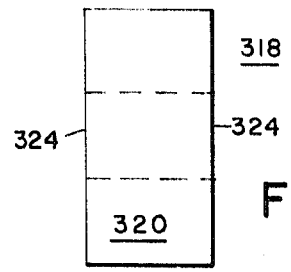
Figure 29B:
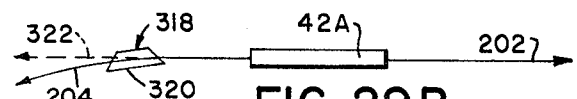
Figure 29C:
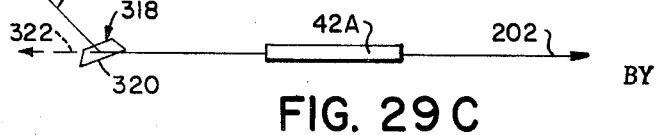

Such a means is shown in FIGS. 29A, 29B and 29C as a trapezoid prism 318 which is positioned in the path of the reference beam 204 adjacent the point of emission of the latter from the double-beam laser device 42A.

As shown, the ultimate direction of the reference beam 204, after passing through the trapezoid prism 318, is a direct function of the relative angle of the base face 320 of the prism 318 and the normal axis 322 of the reference beam 204. The normal axis 322 of the said reference beam 204 is shown in phantom lines in FIGS. 29B and 29C.

Referring to FIG. 29D, an exemplary trapezoid prism 318 is shown in bottom plan view as having parallel side faces 324, orthogonally disposed with respect to the bottom or base face 320 of the prism 318.

Accordingly, if the prism 318 is rotated in a plane parallel with the reference beam 204 and the planes defined by its side faces 324, the reference beam 204 will be diverted in a plane parallel thereto.

Therefore, if FIGS. 29A, 29B and 29C are considered as plan views of a horizontal plane, selective diversion of the reference beam 204 to one side or the other of the laser device 42A can be readily effected by rotation of the trapezoid prism 318 with its base face 320 perpendicular to the horizontal plane.

It becomes readily apparent, therefore, that the present invention provides optical straight edges and new and novel systems for generating and utilizing same, said straight edges comprising precisely aligned multiple laser beams transmitted through space in a predetermined mutual relationship.

By the use of viewing telescopes and the targeting of one beam on any given fixed reference, other points in space may be readily and accurately located by the establishment of a targeted condition of the remaining beam or beams.

Therefore, such problems as surveying, grading, alignment of widely spaced objects, etc., may all be accomplished by the use of laser beams without the need for such cumbersome and inaccurate expedients as string lines, tapes and the like.

Furthermore, in all of the foregoing embodiments, the present invention provides lightweight, economical devices which provide multiple laser beams, and permit ready, selective and precise relative orientation of the multiple laser beams.

Without further description it is believed that the advantages of the present invention over the prior art is apparent and while only several preferred embodiments of the same are illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

I claim:

1. A system establishing a laser beam as a fixed reference line in space comprising, in combination, laser means at a first selected point in space propagating first and second laser beams of substantially equal intensity in substantially opposed, predetermined, relative orientation; first and second target means including optically reflective means for impingement, respectively, by said first and second laser beams; and targeting means being included in said laser means effecting selective impingement of said laser beams on said target means; said first target means being in a preselected second point in space and said second target means, when said second laser beam is impinged thereon, being constrained to a third point in space, in direct alignment with said second laser beam, by said predetermined relative orientation of said first and second laser beams; said second target means and said second laser beam providing a fixed reference for maintaining said first laser beam as a fixed reference line between said first and second points in space.

2. The invention defined in claim 1, wherein said targeting means comprises optical viewing means effecting visual detection of reflected laser beams from said target means.

3. The invention defined in claim 1, wherein each of said target means comprises corner prism means effecting reflection of a laser beam impinged thereon substantially directly back upon itself to said targeting means.

4. The invention defined in claim 3, wherein said targeting means comprises optical viewing means effecting visual detection of reflected laser beams from said target means.

5. The invention defined in claim 3, wherein said corner prism means comprises a matrix of individual corner prisms grouped in close proximity.

6. The invention defined in claim 3, wherein each of said target means further includes a housing on said corner prism means, exposing the obverse face thereof and enclosing the rear face thereof, light shielding means on said housing reducing the amount of ambient light on the said obverse face of said corner prism means, and means effecting selective positioning of said housing in space.

7. The invention defined in claim 6, wherein said corner prism means comprises a matrix of individual corner prisms grouped in close proximity.

8. The invention defined in claim 1, wherein said laser means further includes diverting means effecting selective orientation of said second laser beam relative to said first laser beam.

9. The invention defined in claim 8, wherein said diverting means comprises trapezoidal prism means, in the optical path of said second laser beam, mounted for selective rotary positioning about a predetermined axis to selectively divert said second laser beam from its initial direction of propagation from said laser means.

10. The invention defined in claim 1, wherein said laser means comprises a laser cavity enclosing a gas discharge tube adapted to be energized from a power source to effect emission of coherent light from said cavity, and optical means optically coupled with said laser cavity collimating coherent light emitted therefrom into said first and second laser beams, orienting said laser beams in said substantially opposed relative orientation, and focusing said laser beams for a preselected range of propagation.

11. The invention defined in claim 1, wherein said laser means comprises an elongated symmetrical housing, an elongated gaseous discharge tube, adapted to be energized from a power source, mounted within and extending axially of said housing, dielectric reflector means adjacent each end of said discharge tube defining a laser cavity with said housing, said cavity enclosing said discharge tube, and laser beam collimating means including internal lens means mounted transversely within said housing adjacent each of said reflector means and external of said laser cavity, and objective lens means adjacent the outer ends of and transversely mounted within said housing, said internal lens means being transversely adjustable with respect to the longitudinal axis of said housing to selectively orient laser beams emitted from said cavity with respect to said longitudinal axis and said objective lens means being displaceable along the said longitudinal axis of said housing to focus said laser beams.

12. The system defined in claim 1, which further includes readout means detecting the presence and location of said first laser beam from a fourth point in space comprising light responsive means referenced to said fourth point in space and insertable in the path of said first laser beam and providing an output indicative of the presence thereof.

13. The invention defined in claim 12, wherein said readout means further includes measuring means providing a quantitative readout of the position of said fourth point in space relative to said first laser beam.

14. The invention defined in claim 12, wherein said light responsive means comprises viewing mirror means orientated at an obtuse angle with said first laser beam, in the path thereof, and light transmitting target means over the obverse surface of said mirror means disposed in the path of said first laser beam, said transmitting target means including reference indicia thereon, reflected in said viewing mirror means, impinged upon by said first laser beam, said target means transmitting the image of such an impingement upon said viewing mirror means to provide a visible indication of the coincidence of said first laser beam and said reference indicia.

15. The invention defined in claim 14, wherein said readout means further includes measuring means providing a quantitative readout of the position of said fourth point in space relative to said first laser beam; said measuring means comprising a storey pole, adjustable in length, having said light responsive means mounted on one end thereof, position reference means at the other end thereof indexed to said fourth point in space and indicating means intermediate the said ends for displaying the orientation of said storey pole in space relative to said first laser beam.

16. The invention defined in claim 12, wherein said light responsive means comprises reflective means and an aperture therein transmitting said first laser beam through said reflective means when said first laser beam is targeted on said light responsive means.

17. The invention defined in claim 16, wherein said reflective means comprises a matrix of corner prisms surrounding said aperture and reflecting said first laser beam back along itself when said first beam is immediately adjacent to and out of registry with said aperture.

18. The invention defined in claim 12, wherein said light responsive means comprises optical means internally transmitting and directing said first laser beam towards said fourth point in space when said first beam is impinged thereon.

19. The invention defined in claim 12, wherein said light responsive means comprises photoelectric detector means energized by impingement thereon of said first laser beam, said detector means including transducer means providing an output indication of an impinged condition of said first laser beam.

20. The system defined in claim 1, which further includes means establishing and maintaining a laser beam substantially coincident with a subterranean line parameter of pipelines and the like wherein said first and second points in space are ground surface point referenced at predetermined vertical distances above said line parameter; said first laser beam being a predetermined vertical distance above said line parameter and parallel thereto in a common vertical plane; and said laser means propogating a third laser beam at a predetermined reference point of said line parameter and parallel to said first laser beam in said common vertical plane, thereby establishing said third laser beam substantially coincident with said subterranean line parameter.

21. The invention defined in claim 20, wherein said system further includes subterranean target means disposed along said subterranean line parameter at a predetermined distance from said predetermined reference point thereon, said subterranean target means, when impinged upon by said third laser beam, providing an indication of coincidence of said second laser beam and said subterranean line parameter.

22. A system for establishing and maintaining at least two selectively oriented laser beams in space, comprising, in combination, laser beam projection means at a selected first point in space providing first and second laser beams of substantially equal intensity in substantially opposed, predetermined, relative orientation in space, said projection means including optical transmittance means in the path of said first and second laser beams diverting and transmitting said first and second laser beams through space in first and second mutually parallel projection planes, respectively, and beam splitting means operating on said first laser beam effecting projection of a third laser beam through space in substantially opposed, predetermined, relative orientation to said first laser beam in said first projection plane; first and second target means including optically reflective means for impingement, respectively, by said first and third laser beams; and targeting means included in said projection means effecting selective impingement of said first and third laser beams on said target means, said targeting means being responsive to the reflected energy of said first and third laser beams when the latter are properly impinged on respective ones of said target means; said first target means being in a preselected second point in space and said second target means, when said third laser beam is impinged thereon, being constrained to a third point in space, in direct alignment with said third laser beam, by said predetermined relative orientation of said first and third laser beams; said second target means and said third laser beam providing a fixed reference for maintaining said first laser beam as a fixed reference line in space between said first and second points in space and said second laser beam as a second fixed reference line in space in a projection plane parallel to that of said first reference line and with a predetermined skew orientation relative to said first reference line.

23. The invention defined in claim 22, wherein said optical transmittance means comprises pentaprism means in the optical paths of said first and second laser beams, respectively.

24. The invention defined in claim 23, wherein said pentaprism means are adjustably mounted in said projection means effecting selective skew orientation of said first and second laser beams.

25. The method of establishing and maintaining a laser beam as a reference line in space for conforming excavations, structures and the like to desired grade and elevation parameters between first and second fixed points comprising:
   a. establishing first and second fixed points on a reference surface of known relative elevation;
   b. transmitting first and second laser beams through space in opposed straight line relationship at a known vertical distance above said first fixed point;
   c. impinging said first laser beam on a first fixed target at a predetermined vertical distance above said second point and capable of effecting detection of the impingement of said first beam thereon;
   d. maintaining said impingement;
   e. placing a second target, of the same capabilities as said first fixed target, in the path of said second laser beam at a third random point;
   f. fixing said second target at said third point, and
   g. maintaining the impingement of said second laser beam thereon, thereby establishing a reference position to maintain said first laser beam in a predetermined position in space without further reference to said first fixed target and said second fixed point.

26. The method of claim 25, wherein said first and third fixed points are ground surface points; and wherein said method further includes establishing a given subterranean straight line path plumb with and at a given displacement from said first laser beam by the steps of:
   a. establishing a fixed subterranean point at a known vertical displacement from said first surface point;
   b. transmitting a subterranean third laser beam through space in approximately the direction of said first laser beam from said fixed subterranean point at a known elevation above said subterranean point;
   c. establishing a random subterranean point plumb with and at a known displacement from said first laser beam, and
   d. aligning said second laser beam with said fixed and random subterranean points, thereby establishing a subterranean straight line path plumb with and at a known displacement from said reference straight line path.